(12) United States Patent
Friedel et al.

(10) Patent No.: US 6,357,262 B1
(45) Date of Patent: Mar. 19, 2002

(54) APPARATUS AND METHOD FOR REDUCING SCRATCHING WHEN BENDING GLASS SHEETS (75) Inventors: Kenneth Friedel, Cherry Hill; Clifford Matukonis, Merchantville; Eric L. Tyira, Haddon Heights, all of NJ (US)

(73) Assignee: Tamglass Ltd. Oy, Tampere (FI)

( * ) Notice: Subject to any disclaimer, the term of this patent is extended or adjusted under 35 U.S.C. 154(b) by 0 days.

(21) Appl. No.: 09/299,715

(22) Filed: Apr. 26, 1999

(51) Int. Cl.[7] .......................... C03B 29/08; C03B 35/18
(52) U.S. Cl. .......................... 65/29.19; 65/107; 65/162; 65/273; 65/349; 65/355; 65/370.1; 65/374.13; 65/374.15
(58) Field of Search ................................ 65/29.19, 106, 65/107, 162, 273, 286, 287, 348, 349, 355, 356, 370.1, 374.13, 374.15

(56) References Cited

U.S. PATENT DOCUMENTS

| | | | | |
|---|---|---|---|---|
| 3,492,109 A | * | 1/1970 | Robinson et al. | |
| 3,853,525 A | * | 12/1974 | Gorman | 65/181 |
| 4,260,404 A | * | 4/1981 | Gorman et al. | 65/27 |
| 4,311,509 A | * | 1/1982 | Reader et al. | 65/351 |
| 4,773,925 A | * | 9/1988 | Schultz | 65/106 |
| 4,881,962 A | * | 11/1989 | Reunamaki et al. | 65/104 |
| 5,009,693 A | * | 4/1991 | Freidel et al. | 65/107 |
| 5,118,334 A | * | 6/1992 | Freidel et al. | 65/273 |
| 5,201,928 A | * | 4/1993 | Dicks et al. | 65/106 |

* cited by examiner

Primary Examiner—Sean Vincent
(74) Attorney, Agent, or Firm—John F. A. Earley; John F. A. Earley, III; Harding, Earley, Follmer & Frailey (57) ABSTRACT

A roller assembly for use in a glass bending machine comprises a base bracket, a bending roller rotatably mounted on said base bracket, the bending roller having a three-piece construction comprises a central hub having an annular outer surface, opposed side surfaces, and a central axis of rotation; a collar fixed to each side surface of said central hub, the collars having an annular outer surface, inner and outer side surfaces, and a central axis of rotation; the collars comprising a material and shape which resists scratching glass, the collars being spaced apart with a center section of the hub between them to allow the roller to be driven individually by a friction member whereby the friction member is adapted to run on the center section of the roller to rotate the roller, and a glass sheet is adapted to run on the larger collars and not be scratched by the center section.

31 Claims, 7 Drawing Sheets

APPARATUS AND METHOD FOR REDUCING SCRATCHING WHEN BENDING GLASS SHEETS

FIELD OF THE INVENTION

The present invention relates to an improved bending machine and an improved roller assembly for use in the machine which reduces scratching when a flat glass sheet is bent into curved glass sheet.

BACKGROUND OF THE INVENTION

Many techniques for bending glass sheets are known in the prior art. One known technique involves supporting the edge portion of the glass sheet on a horizontally-positioned, contoured perimeter mold having a depressed center portion. When the glass sheet is heated, gravity causes the unsupported center portion to sag to conform to the shape of the mold.

The aforementioned, gravity-fed, glass bending process is slow. It is known to speed up the process by pressing the hot glass between a pair of upper and lower contoured molds instead of depending on gravity to bend the glass sheet. This method is disclosed by, for example, Seymour in U.S. Pat. No. 3,846,104.

Other methods of bending flat glass sheets into curved glass sheets are disclosed by Ritter et al., U.S. Pat. No. 3,476,540, Rougeux, U.S. Pat. No. 3,600,150, and Seymour, U.S. Pat. No. 4,300,935.

Freidel et al., U.S. Pat. No. 5,009,693, incorporated herein by reference, also disclose a novel method and apparatus for bending glass. According to Freidel's method and apparatus, a glass sheet is heated in an oven on longitudinal rows of fused-silica, mini-rollers until the sheet is softened. When the glass sheet is in condition for bending, the vertical position of the longitudinal rows of rollers is changed to create a desired curved contour. The hot glass sheet sags to conform to the curved contour of the longitudinal rows of rollers. The glass sheet is then quickly conveyed to a quench section of the apparatus.

The quench section also includes longitudinal rows of disc rolls formed into the same curved contour as the rollers in the oven. Quench air tubes support the quench rollers and also function to direct quenching air to the top and bottom surface of the bent glass sheet.

The method and apparatus of Freidel produce high-quality, cost-efficient bent glass sheets. However, when it is necessary to bend the glass sheet into a very deep contour, the outside edges of the glass sometimes get scratched as the glass sags downwardly into the bed of rollers. It is believed that scratching occurs because the glass sheet slides transversely (to the direction of travel of the glass sheets through the oven) downwardly across the corners of the fused silica mini-rollers. Therefore, it would be desirable to provide a vertically-adjustable, roller assembly which will not scratch the glass sheet if the sheet slides transversely across the roller assembly during bending.

SUMMARY OF THE INVENTION

The present invention relates to a bending machine and a roller assembly for use in the machine which reduces scratching when bending flat glass sheets into curved glass sheets. The roller assembly generally comprises a base bracket and a bending roller rotatably mounted on the base bracket. The base bracket has a base portion, two horizontally-extending legs, and two vertically-upwardly-extending shoulders.

The bending roller is mounted on two arms which are pivotally-mounted on the shoulders. The bending roller is supported by a bending roller axle which is removably fixed to and extends between the free end of the arms. The arms are supported on an arm pivot axle which is removably fixed to the bracket shoulders.

The bending roller has a three-piece construction. The bending roller has a central hub having an annular outer surface, opposed side surfaces, and a central axis of rotation. The bending roller also has a collar fixed to each side surface of the central hub.

The collars have an annular outer surface, inner and outer side surfaces, and a central axis of rotation. The collars are coaxial with the central hub. The collars are preferably made of a material and made in a shape which will not scratch the glass sheets passing thereover. The scratch resistant material preferably comprises carbon for application temperatures less than 900 F. and boron nitride for application temperatures greater than 900 F.

The central hub has an annular shoulder protruding axially-outwardly from each side of the hub. The collars have an annular recess extending axially-inwardly from the inner side surface of the collar. The shoulder and recess have complimentary shapes so that the collars and the central hub cooperatively engage one another. Each collar has a diameter larger than the diameter of the central hub.

The bending roller includes a set pin extending axially from one collar, through the central hub, and into the second collar. A pinch roller is rotatably mounted between the legs of the base bracket and is constructed and arranged to rotatably contact only the central hub of the bending roller. As the pinch roller drives the central hub, the set pin insures that the collars also are rotated along with the central hub.

The collars have rounded corners at the intersection of the outer annular surface and the outer side surface. This construction helps prevent scratching of the glass sheets.

The roller assembly also includes means for preventing the pivot arm axle from binding on the shoulders due to the buildup of scale over a long period of time. In a preferred embodiment, the means for preventing binding comprises a pair of opposed, open-ended slots in the arms of the bracket in which the pivot arm axle is supported.

The above-described roller assemblies are designed to operate at a temperature not greater than about 900° F., above which temperature the carbon collars begin to fail. However, in order to bend glass sheets, the glass sheet must be heated to a softening temperature of about 1300° F. Therefore, the present invention provides a novel machine for bending glass sheets using the above-described roller assemblies wherein whereby the temperature in the area of the roller assemblies is maintained below 900° F.

The bending machine of the present invention includes a bending chamber housing, conveyor rolls to transport glass sheets to and from the bending chamber, a first and second sets of mini-rolls to support the glass sheet in the bending chamber, means for raising and lowering the first and second sets of mini-rolls, and a means for rotating the mini-rolls and the conveyor rolls. The bending machine also preferably has a pre-heat oven for heating the glass sheet to a softened, bendable condition prior to conveying the glass sheet to the chamber housing.

The chamber housing has an entrance end and an exit end. A plurality of conveyor rolls are located proximate the entrance and exit of the chamber.

The chamber housing preferably has a two-piece hearth construction having an upper portion and a lower portion.

The upper portion is constructed and arranged to be raised and lowered relative to the conveyor rolls.

The first set of mini-rolls are constructed and arranged to be raised and lowered along with the upper portion of the housing. The first set of mini-rolls preferably comprises fused-silica mini-rolls.

The mini-rolls of the second set are arranged in longitudinal rows across the width of the chamber. The mini-rolls of the second set preferably have a three-piece construction. The rolls have a central hub having an annular outer surface, opposed side surfaces, and a central axis of rotation. A collar is fixed to each side surface of the central hub. The collars have an annular outer surface, inner and outer side surfaces, and a central axis of rotation. The collars are preferably made of a material and in shape which resists scratching the glass sheets.

The bending machine includes means for raising and lowering each longitudinal row of mini-rolls in the second set to form a desired contour.

An insulation layer is arranged intermediate the first set of mini-rolls and the second set of mini-rolls. The insulation layer divides the chamber into an upper and lower section each of which can be controlled at a different temperature.

Heating means are located in the upper and lower sections of the chamber, and cooling means are located in the lower section. The cooling means preferably comprises a plurality of transversely-extending, elongate, perforated air pipes connected to an air source. The insulation layer is mounted on top of the air pipes. The insulation layer and air pipes are constructed and arranged to be raised and lowered relative to the conveyor rolls.

The bending machine further includes means for controlling the temperature of the chamber in the upper section independent of the temperature in the lower section of the chamber. The control means includes a controller and thermocouples which are located proximate the heating means, cooling pipes, and second set of mini-rolls.

The present invention further includes a method of bending a glass sheet using a plurality of roller assemblies having a maximum operating temperature below the bending temperature of the glass sheet. The glass sheet is initially preheated at a temperature above the bending temperature of the glass sheet. The glass sheet is then conveyed to a heated bending chamber having a plurality of roller assemblies arranged in longitudinal rows supporting the glass sheet. The temperature within the chamber proximate the roller assemblies is maintained as high as possible without exceeding the maximum operating temperature of the roller assembly. The rows of roller assemblies supporting the glass sheet are raised or lowered to a desired contour to bend the glass sheet.

DESCRIPTION OF PREFERRED EMBODIMENTS OF THE INVENTION

The present invention is described with reference to FIGS. 1–11 wherein like reference numerals correspond to similar components depicted therein.

The roller assembly of the present invention, designated generally by reference numeral 10, is designed for use in a glass bending apparatus such as disclosed below with reference to FIGS. 8–11. A plurality of the roller assemblies 10 shown in FIGS. 1–7 support the glass sheet 15 as the glass sheet 15 is conveyed through the bending section 118 of the glass bending machine 111.

The roller assembly 10 is preferably fixed to means (not shown) for raising and lowering the roller assembly 10 to change the vertical position of the roller assembly 10 to a desired position for glass bending. The roller assembly 10 is also preferably attached to means (not shown) for pivoting the roller assembly so that when the roller assembly is raised or lowered, the roller assembly 10 tilts so that the surface of the bending roller 20 remains tangent to the surface of the glass sheet during bending.

Figure 3:
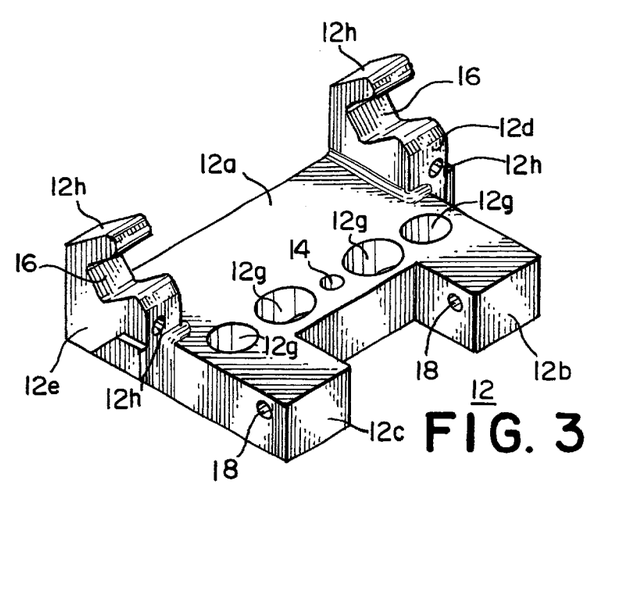
FIG. 3 is a perspective view of the base bracket of the roller assembly shown in FIGS. 1 and 2.

The roller assembly has a base bracket 12 which is best seen in FIG. 3. The bracket 12 has a generally rectangular base portion 12a, two horizontally-extending legs 12b, 12c, and two upwardly-extending shoulders 12d, 12e. The bracket 12 is preferably made of RA 310 steel available from Rolled Alloys, Temperance, Ohio, or 316L stainless steel. The bracket 12 is preferably machined from bar stock or, alternatively, extruded and/or cast into the desired shape.

The base portion 12a of the bracket 12 includes a series of apertures 12g vertically-extending therethrough. The apertures 12g are used to fix the bracket 12 to its mounting surface (not shown) with two socket head cap screws (not shown).

The base portion 12a includes a dowel 14 protruding downwardly from the bottom surface of the base portion 12a of the bracket 12. The dowel 14 is used to center the roller assembly 10 to the means (not shown) for raising and lowering the roller assembly and tilting the roller assembly. The dowel also allows the bracket 12 to be rotated to properly align with the drive mechanism (not shown).

An open ended slot 16 is formed in each of the vertically-extending shoulders 12d, 12e. As described below, an arm pivot axle 24 is supported in the slot 16 by the shoulders 12d, 12e. Opposed apertures 12h are located proximate the open end of the slots 16. The apertures 12h receive a cotter pin 26 which locks the arm pivot axle 24 in the slots 16.

Each leg 12b, 12c has a horizontally-extending aperture 18 therethrough. As described below, a pinch roller axle 34 is fixed in the leg apertures 18 intermediate the legs 12b, 12c. The pinch roller axle 34 supports a pinch roller 32 as best seen in FIGS. 1 and 2.

A bending roller, designated generally by reference numeral 20, is rotatably mounted on the free ends of two arms 22 which are pivotally mounted on the shoulders 12d, 12e. The bending roller 20 is mounted on a bending roller axle 20 which is supported by the free ends of the arms 22.

Each arm 22 is pivotally mounted on one of the shoulders 12d, 12e. The arms 22 have a generally rectangular, elongate shape as best seen in FIG. 1. Each end of the arms 22 includes an aperture extending therethrough. The base end 22a of the arm 22 is pivotally-mounted on the arm pivot axle 24 which is supported in the open-ended slot 16 in the shoulders 12d, 12e. The arm pivot axle 24 extends through both arms 22 and traverses the bracket through the open-ended slots 16. The open-ended slot prevents the arm pivot axle 24 from binding on the shoulders due to the buildup of scale.

Figure 1:
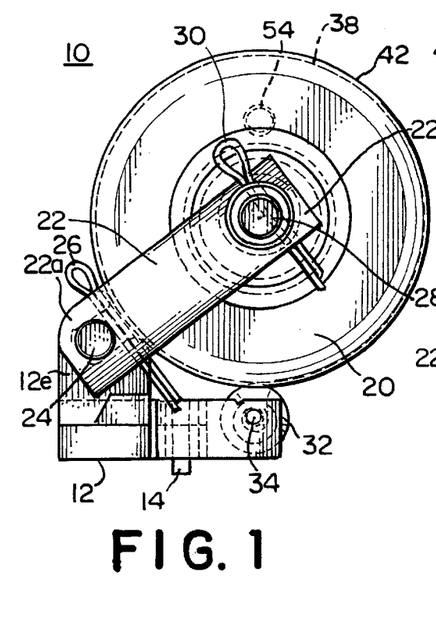
FIG. 1 is a side elevational view of a roller assembly in accordance with a preferred embodiment of the present invention.
Figure 2:
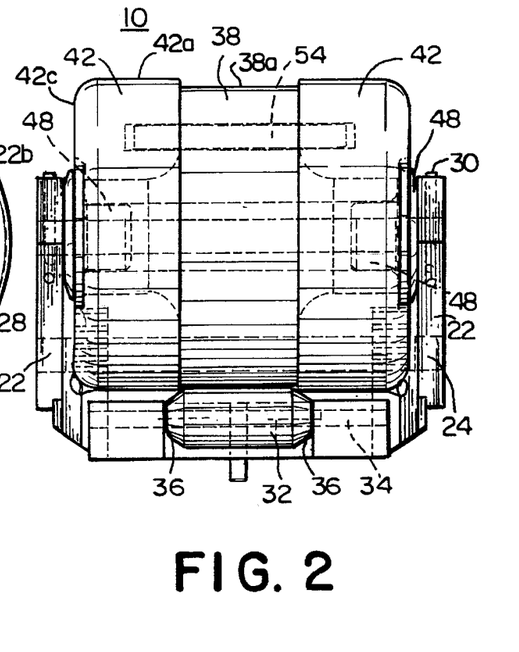
FIG. 2 is a front elevational view of a roller assembly in accordance with a preferred embodiment of the invention.
Figure 6:
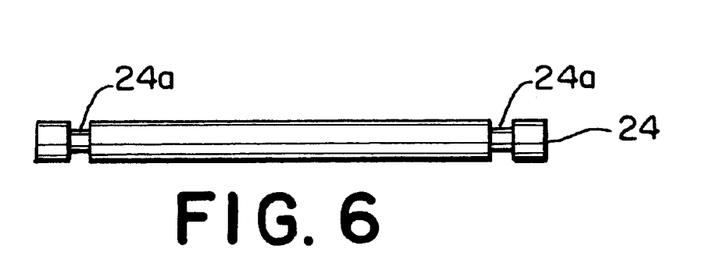
FIG. 6 is a front, elevational view of an arm pivot axle of the roller assembly shown in FIGS. 1 and 2.

A pair of cotter pins 26 secures the arm pivot axle 24 in the open-ended slots by traversing the open end of the open-ended slot 16 as seen in FIG. 1. Each cotter pin 26 extends through the apertures 12h in the shoulders 12d, 12e. Each cotter pin abuts the arm pivot axle 24 in an annular groove 24a formed in the outer surface of the arm pivot axle 24 as best seen in FIG. 6.

Figure 7:
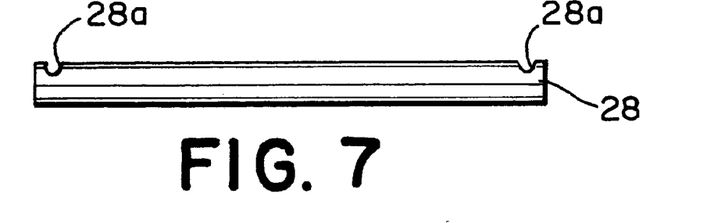
FIG. 7 is a front, elevational view of a bending roller axle of the roller assembly shown in FIGS. 1 and 2.

The free end 22b of the arms 22 supports the bending roller axle 28 which extends through an aperture in each free end 22b of the arms 22. The bending roller axle 28 is held in place on the free end 22b of the arms 22 by a second cotter pin 30. The second cotter pin 30 extends through a pair of apertures in the free end 22b of the arm 22 and abuts the bending roller axle 28 at a flat 28a formed in a portion of the outer surface of the bending roller axle 28 as best seen in FIG. 7. The bending roller 20 is supported on and rotates about the bending roller axle 28.

In a preferred embodiment, the arms 22 and pivot axle 24 may be made of 316L stainless steel or RA 310 steel available from Rolled Alloys, Temperance Ohio. The roller axle 28 is preferably made of AMS 5759 which is available from Haynes Alloy as #25.

The bending roller 20 rotatably engages a pinch roller 32 as best seen in FIG. 1. The pinch roller 32 is rotatably supported on a pinch roller axle 34 which is mounted in the apertures 18 formed in the legs 12b, 12c. The pinch roller 32 includes a shim spacer 36 located on the axle intermediate the axial ends of the pinch roller 32 and the inner surface of the legs 12b, 12c. In a preferred embodiment, the pinch roller is made of alumina 99.5–99.9 available from, for example, TGL Tempering Systems, Cinnaminson, N.J.

Figure 4A:
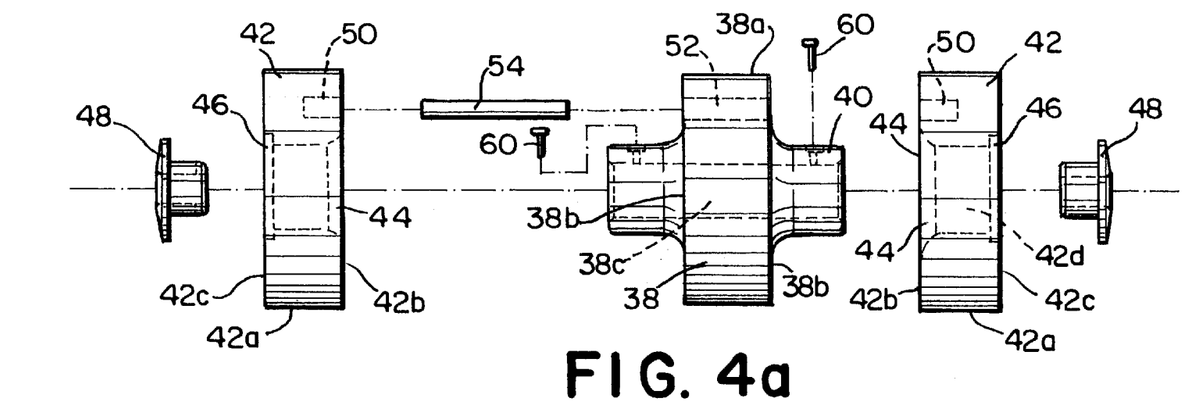
FIG. 4a is an exploded, front elevational view of a bending roller of the roller assembly shown in FIGS. 1 and 2.
Figure 4B:
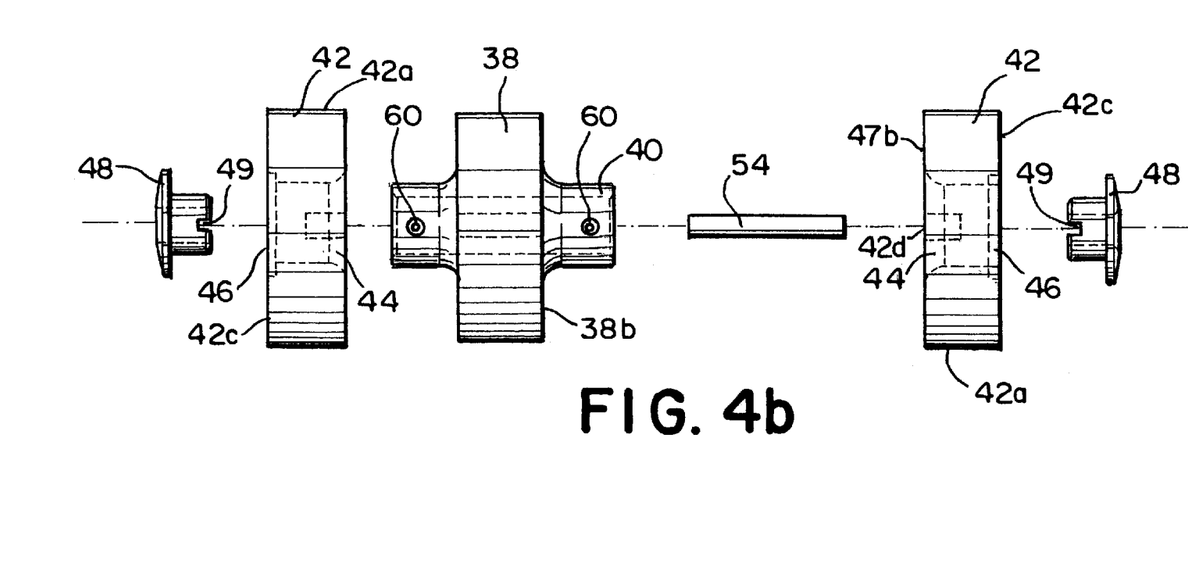
FIG. 4b is an exploded top plan view of a bending roller of the roller assembly shown in FIGS. 1 and 2.
Figure 5:
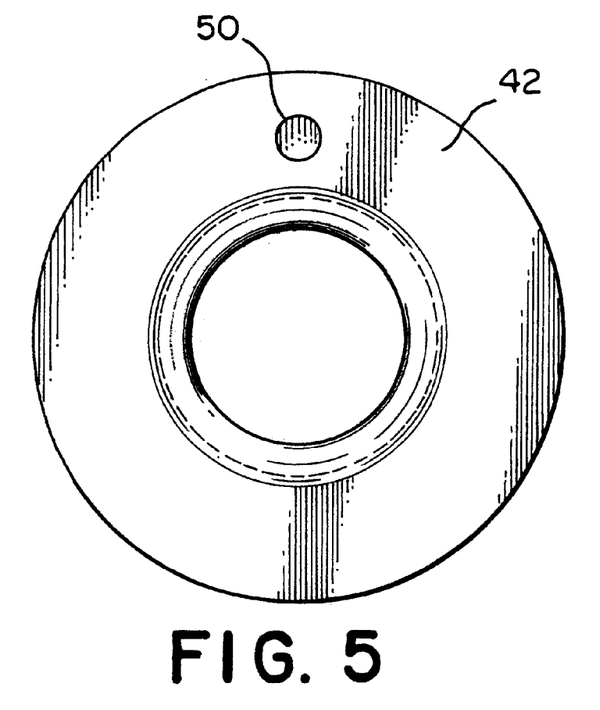
FIG. 5 is a side, elevational view of a scratch-resistant collar of the roller assembly shown in FIGS. 1 and 2.

The bending roller 20 has a three-piece construction as best seen in the exploded view of FIG. 4. The bending roller 20 has a central hub 38 having an annular outer surface 38a, opposed side surfaces 38b, and a central axis of rotation 38c. The central hub 38 has an annular shoulder 40 protruding axially-outwardly from each side of the central hub 38. The central hub 38 is preferably made of fused silica available from, for example, George Ford & Sons, Wyndmoor, Pa.

The bending roller has two scratch-resistant collars 42 fixed to each side surface 38b of the central hub 38. The collars 42 have an annular outer surface 42a, inner and outer side surfaces 42b, 42c, respectively, and a central axis of rotation 42d. The diameter of the collar 42 is slightly larger than the diameter of the central hub 38. Preferably, the collars 42 are made of a scratch-resistant material such as carbon available from, for example, Pure Carbon Company, St. Mary's, Pa., or boron nitride.

The collars 42 have an annular recess 44 extending axially-inwardly from the inner side surface 42b of the collar 42. The hub shoulder 40 and the recess 44 preferably have complimentary shapes so that the collars and the central hub cooperatively engage one another.

The collars 42 also have an annular recess 46 in the outer side surface. The annular recess 46 is designed to receive a bushing 48 which prevents the bending roller from wearing on the bending roller axle 28. Each bushing 48 is rotatably secured in the collars 42 by a locking pin 60 which extends through the hub shoulder 40 and into the central bore of the central hub. The locking pin 60 engages a slot 49 in one end of the bushing 48 so that the bushing 48, central hub 38 and collars 42 rotate together as a unit.

Each collar 42 has an axial bore 50 formed in the inner side surface of the collar 42b. The central hub 38 also has an axial bore 52 which extends entirely through the hub 38. The collar axial bores 50 and the hub axial bore 52 are located at the same radial location. A common set/drive pin 54 extends from one bore 50, through the bore 52 in the central hub 38, to the other bore 50. The set/drive pin 54 insures that the central hub 38 and the collars 42 rotate in unison.

Referring to FIGS. 2 and 4, the collars are rounded at the intersection of the outer annular surface 42a and the outer side surface 42c. The rounded corners help prevent scratching of the glass sheets during bending, especially as the glass sheets slide on the rolls transverse to the path of travel of the sheets.

Normally, a glass sheet must be heated to a temperature of about 1170° F. before bending. In the prior art, the glass sheet is supported on fused-silica mini-rollers which are capable of withstanding the high heat of a glass processing oven. The roller assemblies 10 of the present invention, however, will only tolerate operating temperatures of 800–900° F. at which temperature the carbon collars begin to break down. Therefore, the roller assemblies 10 must not be exposed to an operating temperature greater than about 900° F. Preferably, the roller assemblies are exposed to an operating temperature no greater than 750–800° F.

To bend glass using the above-described roller assemblies 10, the present invention provides a novel method and apparatus whereby the temperature in the area of the roller assemblies 10 is maintained below about 900° F. preferably in the range of 750–800° F. This temperature limit is well below the normal oven temperature for a bending and tempering machine using conventional fused-silica rolls.

A preferred embodiment of a machine for bending glass sheets 15 is shown in FIGS. 8–11. The machine, designated generally by reference numeral 111, includes a load conveyor 113 which transports a glass sheet 15 to an oven 117 where the glass sheet 15 is heated to a softened condition. From the oven 117, the load conveyor 113 transports the glass sheet 15 to a heated bending chamber 118 where the glass sheet is bent to the desired contour. From the bending chamber 118, the glass sheet is conveyed to a quench section 119 for quenching the hot, bent glass sheet 15. After quenching, the load conveyor 113 transports the quenched sheet to a cooling section 131 which is positioned next to the quenching section 119. Finally, the load conveyor 113 transports the cooled, quenched, bent glass sheet to an unload conveyor 133.

Figure 8:
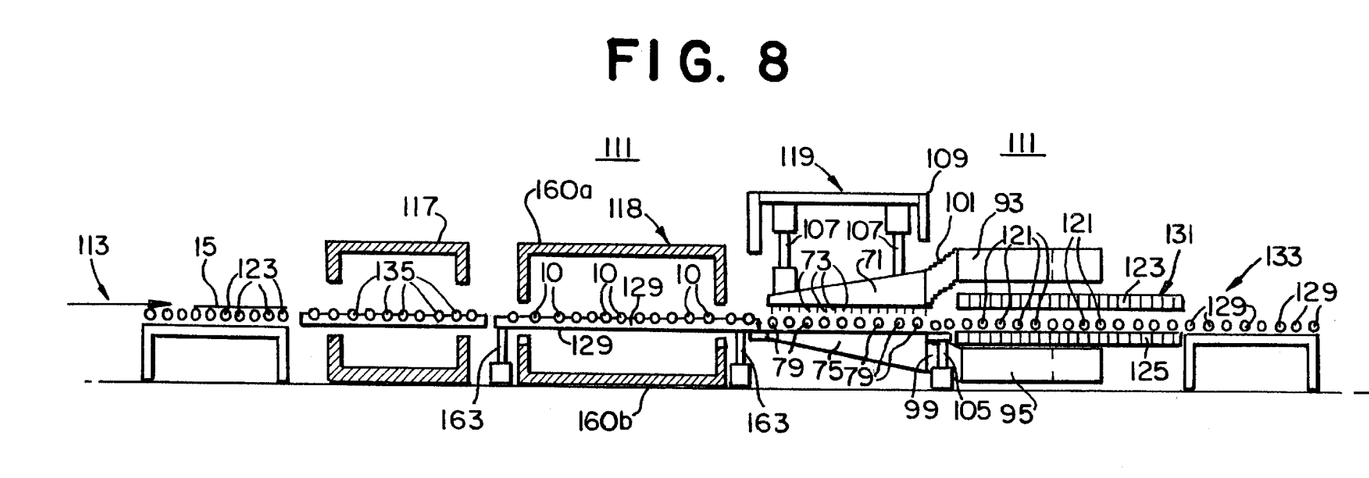
FIG. 8 is a side, elevational view of a bending machine in accordance with an embodiment of the invention.

While in the oven 117, the glass sheet is supported on fused-silica, mini-rolls 135. While in the bending chamber 118, the sheet 15 is supported either on fused-silica mini-rolls (when running flat glass) or on the novel carbon collar rolls 10 of the present invention (when running bent glass).

The carbon collar rolls 10 are mounted on actuators 163 such as described in U.S. Pat. No. 5,009,693. The actuators 163 may be air cylinders, or other actuators, with piston rods extending therefrom that raise and lower a bar 129 and the rollers 10 that each bar 129 supports. The actuators 163 are preferably mechanical, but may also be electromechanical or hydraulic, and are tied into a programmable controller 162 which determines the length of stroke of the actuators 163 and causes the bars 129 to be raised and lowered in synchronization.

In contrast with prior art bending and tempering machines, the apparatus of the present invention includes a preheat oven 117 and a separate bending chamber 118. The bending chamber of the present invention is described in greater detail with reference to FIGS. 9 and 10.

Figure 9:
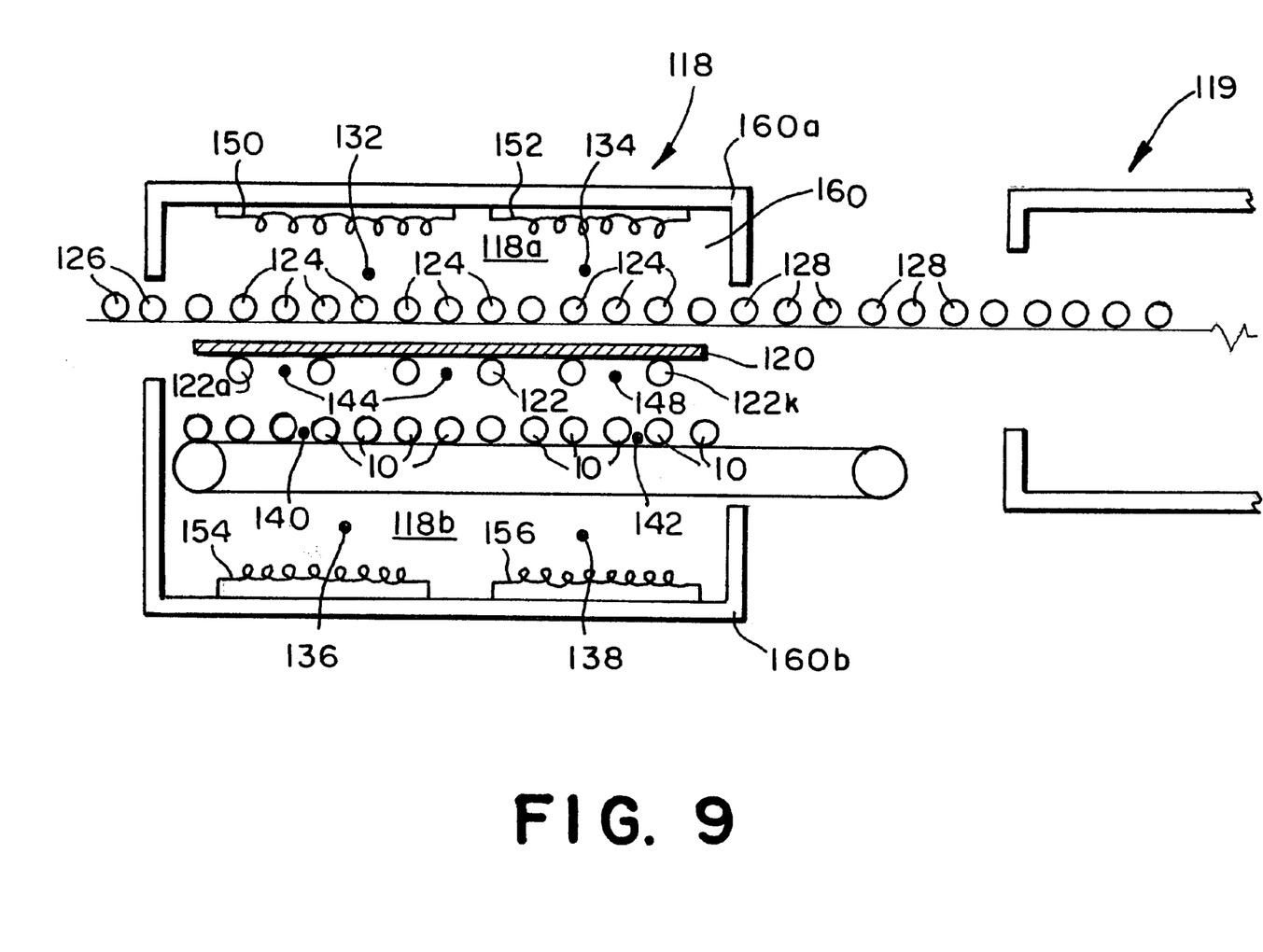
FIG. 9 is an enlarged side, elevational view of the bending chamber of FIG. 8 shown in a configuration for running flat glass.
Figure 10:
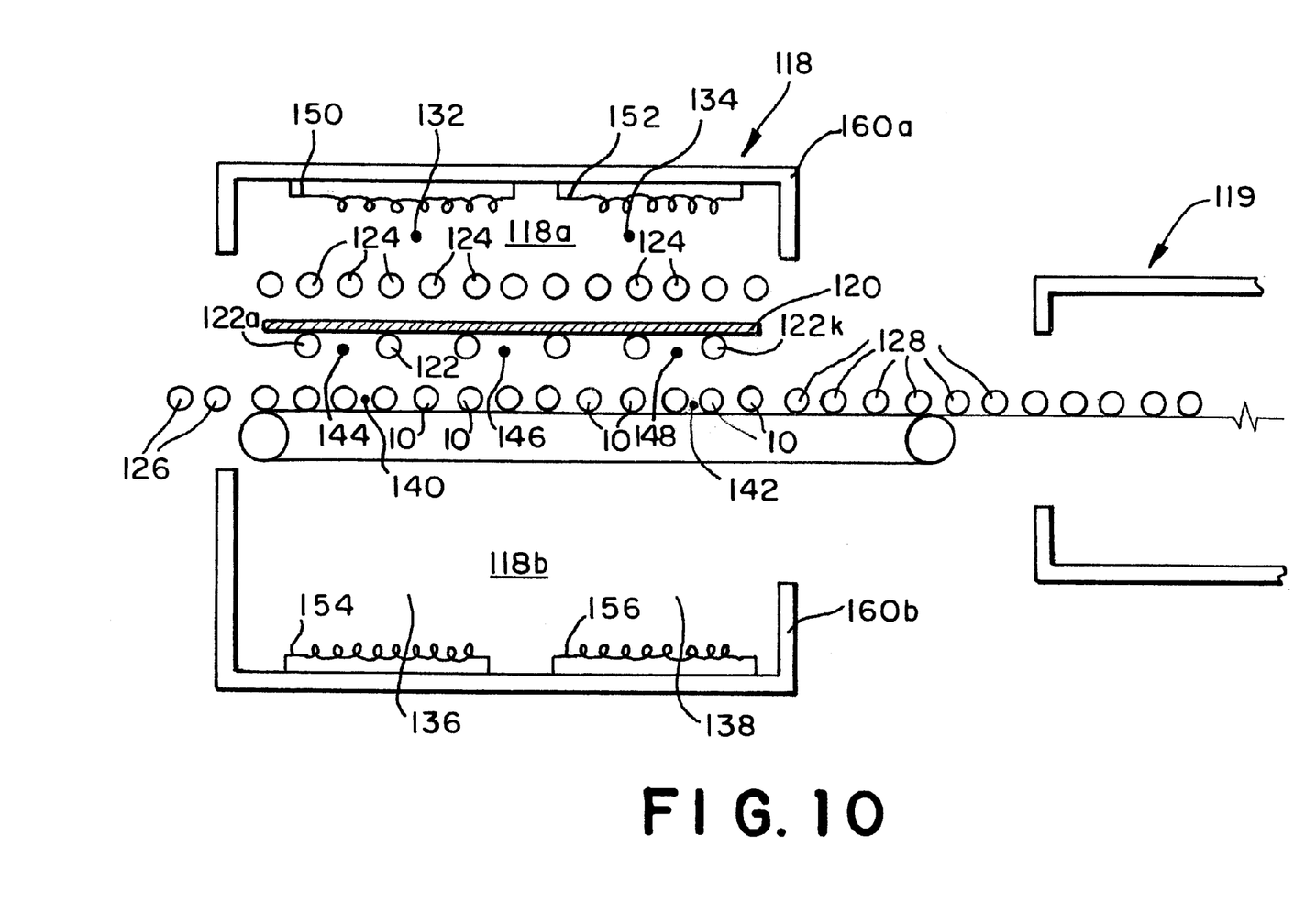
FIG. 10 is an enlarged, side elevational view of the bending chamber of FIG. 8 shown in a configuration for running bent glass; and, FIG. 11 is a schematic diagram of the control system of the bending machine of the present invention.

The bending chamber 118 preferably comprises a two-piece hearth 160 having an upper piece 160a and a lower piece 160b. The upper piece 160a of the hearth can be raised and lowered relative to the bottom piece 160b for running either bent glass or flat glass. The bending chamber is physically divided into an upper 118a and lower 118b section by a horizontally-extending layer of insulation 120. The insulation layer 120 is preferably a low density, ceramic fiber board which is approximately ½ inch thick. The fiber board is treated to remain rigid and coated with a ceramic paint to prevent deterioration.

The insulation layer 120 is supported in the bending chamber by a lattice work of stainless steel strips approximately ⅛ inch thick which lay directly on top of a series of horizontally-extending cooling air pipes 122. The air pipes 122 are connected via an air manifold (not shown) to a source of cooling air 165. Each air pipe 122 has a series of apertures along its length which direct cooling air generally horizontally into the lower chamber. Air is supplied intermittently to the air pipes to regulate the temperature in the chamber. The apparatus preferably has about 11 air flow pipes 122a, 122b, 122c, 122d, 122e, 122f, 122g, 122h, 122i, 122j, 122k. Air flow through the pipes 122 is controlled by a controller 162 in accordance with the operating procedure set forth below.

The bending chamber preferably has a pair of heating elements 150, 152 located in the upper section 118a and a pair of heating elements 154, 156 located in the lower section 118b. The heating elements 150, 152, 154, 156 are independently controlled by the controller 162 to regulate the temperature profile within the bending section.

A plurality of horizontally-extending rows (plane) of fused-silica rolls 124 are arranged above the insulation layer 120 in the upper section 118a of the bending chamber 118. The fused-silica rolls 124, such as described in U.S. Pat. No. 5,009,693, are constructed to withstand the higher operating temperatures maintained in the upper section 118a of the bending chamber 118. The upper section of the bending chamber 118 operates at a temperature of about 1250° F.

A plurality of horizontally-extending rows (plane) of carbon collar rolls 10 are arranged below the insulation layer 120 in the lower section of the bending chamber 118. The roller assemblies are mounted on bars 129 which are connected to actuators 163 such as described in U.S. Pat. No. 5,009,693. The lower section 118b of the bending chamber 118 is maintained by the controller at a temperature of about 750–800° F.

Due to the insulation layer 120, the operating temperature in the upper and lower sections of the bending chamber 118 can be independently controlled. As described above, the carbon collar roller assemblies 10 of the present invention begin to break down at operating temperatures of approximately 900° F. Therefore, the carbon collar roller assemblies 10 are located only in the section of the bending chamber which is operated at a temperature of less than 900° F., preferably less than 850° F., and most preferably at an operating temperature of 750–800° F.

The carbon collar roller assemblies 10 of the present invention have particular use for bending glass but provide little advantage for processing flat glass. Therefore, the bending chamber 118 of the present invention provides a system where the carbon collar roller assemblies 10 are raised and lowered into an in-line operating position (relative to the conveyor rolls 126, 128) only when running bent glass, whereas the fused-silica rolls 124 are raised and lowered into an in-line operating position (relative to the conveyor rolls 126, 128) when running flat glass.

Referring to FIG. 9, when running flat glass, the fused-silica rolls 124 are arranged in-line with the fixed conveyor rolls 126 leading from the oven and the fixed conveyor rolls 128 leading to the quench section 119. In this configuration, the bending chamber provides sufficient clearance for a flat sheet of glass 15 to pass through the chamber without interference or obstruction.

When running flat glass, the bending chamber 118 provides additional heating of the glass sheet 15 as the glass sheet 15 travels from the pre-heat oven 117 to the quench section 119. However, when running bent glass, the bending chamber 118 bends the glass to the desired contour.

Referring to FIG. 10, when running bent glass, the fused-silica rolls 124, insulation layer 120, air pipes 122, and top portion 160a of the hearth 160 are raised approximately 6 inches as seen in FIG. 10 compared with FIG. 9. Simultaneously, the carbon collar roller assemblies 10 are raised upwardly by the actuators 163 in line with the fixed conveyor rolls 126 leading from the oven and the fixed conveyor rolls 128 leading to the quench section. The fused-silica rolls 124, insulation layer 120, air pipes 122, and top portion 160a of the hearth 160 are raised to provide the necessary clearance for the bent glass sheet to pass through the bending chamber.

Figure 11:
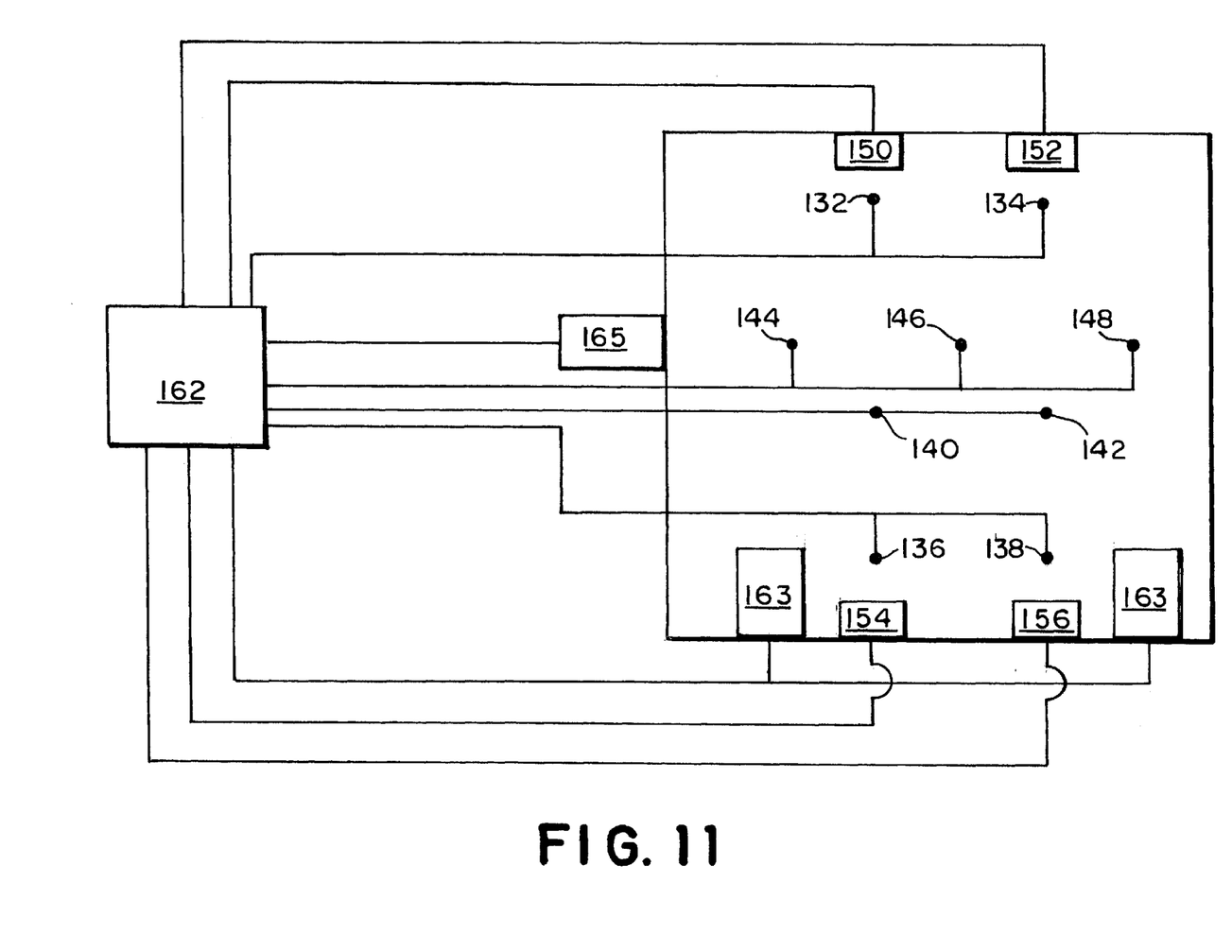

The bending chamber 118 includes multiple thermocouples which are used to sense the temperature at selected locations throughout the bending chamber 118. Two thermocouples 132, 134 are located proximate the heating elements 150, 152 in the upper section 118a of the bending chamber. Two thermocouples 136, 138 are located proximate the heating elements 154, 156 in the lower section 118b of the bending chamber 118. Two thermocouples 140, 142 are located proximate the carbon collar roller assemblies 10. The first thermocouple 140 is located proximate the entrance to the bending chamber 118 while the second thermocouple 142 is located proximate the exit from the bending chamber 118. The roller assembly thermocouples 140, 142 measure the temperature proximate the roller assemblies 10.

Three thermocouples 144, 146, 148 are located proximate the air pipes 122 in the lower chamber 118b. A first air pipe thermocouple 144 is located proximate the entrance to the bending chamber. A second air pipe thermocouple 146 is located proximate the middle of the bending chamber 118. A third air pipe thermocouple 148 is located proximate the exit from the bending chamber 118. The air pipe thermocouples measure the temperature above a glass sheet which is supported on the carbon collar roller assemblies 10.

In a preferred embodiment, the thermocouples 140, 142 proximate the carbon collar roller assemblies 10 and the thermocouples 144, 146, 148 proximate the air pipes 122 control the temperature in both sections of the bending chamber 118. If the temperature drops below a set-point, the heating elements 132, 134, 136, 138 are activated to add heat to the chamber. If the temperature rises above a set-point, the air source 165 to the air pipes 122 is activated to cool the chamber.

The control elements for the bending chamber 118 are preferably divided into two subsystems, each of which either controls the entrance side of the bending chamber 118 or the exit side of the bending chamber 118.

In a preferred embodiment, the thermocouples proximate the heating elements each control activation of the respective heating elements. The thermocouples proximate the air pipes 122 and the carbon collar roller assemblies 10 control activation of the supply of air to the air pipes 122. In other words, thermocouple 132 controls heating element 150; thermocouple 134 controls heating element 152; thermocouple 144 controls air flow to air pipes 122a, 122b, 122c; thermocouple 146 controls air flow to air pipes 122d, 122e, 122f and 122g; thermocouple 148 controls air flow to air pipes 122h, 122i, 122j, 122k; thermocouple 136 controls heating element 154; and, thermocouple 138 controls heating element 156. This control allows the air pipes and the heating elements to fire at the same time. This leads to a more uniform temperature in the bender.

Cooling air is only supplied to the air pipes when no glass sheet is near the pipe, otherwise the cooling air would hit the glass and prematurely cool the glass before the glass sheet reaches the quench section.

The cooling air is supplied to the pipes for a duration proportionate with the temperature deviation from the set point. For example, if the temperature near the pipes is only 1 degree above the set point, the pipes will fire 1 second out of 5. If the temperature is 2 degrees above the set point, the pipes will fire 2 seconds out of 5. Time proportioning of the supply of cooling air provides more uniform glass temperature.

What is claimed is:

1. A roller assembly for use in a glass bending machine comprising
   a) base bracket;
   b) bending roller rotatably mounted on said base bracket, said bending roller having a three-piece construction comprising:
      i) a central hub having an annular outer surface, opposed side surfaces, and a central axis of rotation;
      ii) a collar fixed to each side surface of said central hub, said collars having an annular outer surface, inner and outer side surfaces, and a central axis of rotation, said collars comprising a material and shape which resists scratching glass, said collars being spaced apart with a center section of the hub between them, to allow the roller to be driven individually by friction means whereby friction means is adapted to run on the center section of the roller to rotate the roller, and a glass sheet is adapted to run on the larger collars and not be scratched by the center section.

2. The roller assembly recited in claim 1, said friction means being a pinch roller.

3. The roller assembly recited in claim 1, said scratch resistant materials comprising carbon or boron nitride.

4. The roller assembly recited in claim 1, said collars being co-axial with said central hub.

5. The roller assembly recited in claim 1, each of said collars having an outer diameter larger than the outer diameter of said central hub.

6. The roller assembly recited in claim 1, said central hub portion having an annular shoulder protruding axially-outwardly from each side of said hub.

7. The roller assembly recited in claim 6, said collars having an annular recess extending axially-inwardly from the inner side surface of said collar.

8. The roller assembly recited in claim 7, said shoulder and recess having complimentary shapes so that said collars and central hub cooperatively engage one another.

9. The roller assembly recited in claim 8, said bending roller including a set pin extending axially from one collar, through said central hub, and into the second collar.

10. The roller assembly recited in claim 1, including a pinch roller rotatably mounted on said base bracket, said pinch roller constructed and arranged to rotatably contact only the central hub of said bending roller to drive the central hub.

11. The roller assembly recited in claim 1, each of said collars having an outer annular recess extending axially-inwardly from the outer surface of said collar, a bushing having a shape complimentary with said outer annular recess so that said bushing cooperatively engages said outer annular recess, and a locking pin engaging said hub and said bushing to ensure uniform rotation of said hub and said bushings.

12. The roller assembly recited in claim 1, said collars having rounded corners at the intersection of said annular surface and the outer side surface.

13. The roller assembly recited in claim 1, said central hub comprising a fused silica material.

14. A roller assembly for use in a glass bending machine comprising
   a) base bracket;
   b) bending roller rotatably mounted on said base bracket, said bending roller having a three-piece construction comprising:
      i) a central hub having an annular outer surface, opposed side surfaces, and a central axis of rotation;
      ii) a collar fixed to each side surface of said central hub, said collars having an annular outer surface, inner and outer side surfaces, and a central axis of rotation, said collars comprising a material and shape which resists scratching glass, said collars being spaced apart with a center section of the hub between them, to allow the roller to be driven individually by friction means whereby friction means is adapted to run on the center section of the roller to rotate the roller, and a glass sheet is adapted to run on the layer collars and not be scratched by the center section, said bracket including a base portion, two horizontally-extending legs, two vertically-upwardly extending shoulders, and a pair of arms pivotally mounted on said shoulders.

15. A roller assembly for use in a glass bending machine comprising
   a) base bracket;
   b) bending roller rotatably mounted on said base bracket, said bending roller having a three-piece construction comprising:
      i) a central hub having an annular outer surface, opposed side surfaces, and a central axis of rotation;
      ii) a collar fixed to each side surface of said central hub, said collars having an annular outer surface, inner and outer side surfaces, and a central axis of rotation, said collars comprising a material and shape which resists scratching glass, said collars being spaced apart with a center section of the hub between them, to allow the roller to be driven individually by friction means whereby friction means is adapted to run on the center section of the roller to rotate the roller, and a glass sheet is adapted to run on the layer collars and not be scratched by the center section, said bracket including a base portion, two horizontally-extending legs, two vertically-upwardly extending shoulders, and a pair of arms pivotally mounted on said shoulders, including an arm pivot axle removably fixed to said shoulders and said pinch roller rotatably fixed between said legs.

16. A roller assembly for use in a glass bending machine comprising
a) base bracket;
b) bending roller rotatably mounted on said base bracket, said bending roller having a three-piece construction comprising:
   i) a central hub having an annular outer surface, opposed side surfaces, and a central axis of rotation;
   ii) a collar fixed to each side surface of said central hub, said collars having an annular outer surface, inner and outer side surfaces, and a central axis of rotation, said collars comprising a material and shape which resists scratching glass, said collars being spaced apart with a center section of the hub between them, to allow the roller to be driven individually by friction means whereby friction means is adapted to run on the center section of the roller to rotate the roller, and a glass sheet is adapted to run on the layer collars and not be scratched by the center section, said bracket including a base portion, two horizontally-extending legs, two vertically-upwardly extending shoulders, and a pair of arms pivotally mounted on said shoulders, including an arm pivot axle removably fixed to said shoulders and said pinch roller rotatably fixed between said legs, including a bending roller axle removably fixed to and extending between the free end of said arms.

17. A roller assembly for use in a glass bending machine comprising
a) base bracket;
b) bending roller rotatably mounted on said base bracket, said bending roller having a three-piece construction comprising:
   i) a central hub having an annular outer surface, opposed side surfaces, and a central axis of rotation;
   ii) a collar fixed to each side surface of said central hub, said collars having an annular outer surface, inner and outer side surfaces, and a central axis of rotation, said collars comprising a material and shape which resists scratching glass, said collars being spaced apart with a center section of the hub between them, to allow the roller to be driven individually by friction means whereby friction means is adapted to run on the center section of the roller to rotate the roller, and a glass sheet is adapted to run on the layer collars and not be scratched by the center section, said bracket including a base portion, two horizontally-extending legs, two vertically-upwardly extending shoulders, and a pair of arms pivotally mounted on said shoulders, including an arm pivot axle removably fixed to said shoulders and said pinch roller rotatably fixed between said legs including a bending roller axle removably fixed to and extending between the free end of said arms, said base including means for preventing the arm pivot axle from binding on said arms from the build up of scale.

18. A roller assembly for use in a glass bending machine comprising
a) base bracket;
b) bending roller rotatably mounted on said base bracket, said bending roller having a three-piece construction comprising:
   i) a central hub having an annular outer surface, opposed side surfaces, and a central axis of rotation;
   ii) a collar fixed to each side surface of said central hub, said collars having an annular outer surface, inner and outer side surfaces, and a central axis of rotation, said collars comprising a material and shape which resists scratching glass, said collars being spaced apart with a center section of the hub between them, to allow the roller to be driven individually by friction means whereby friction means is adapted to run on the center section of the roller to rotate the roller, and a glass sheet is adapted to run on the layer collars and not be scratched by the center section, said bracket including a base portion, two horizontally-extending legs, two vertically-upwardly extending shoulders, and a pair of arms pivotally mounted on said shoulders, including an arm pivot axle removably fixed to said shoulders and said pinch roller rotatably fixed between said legs including a bending roller axle removably fixed to and extending between the free end of said arms, said base including means for preventing the arm pivot axle from binding on said arms from the build up of scale, said preventing means comprising a pair of opposed, open-ended slots in the arms of said bracket, said arm pivot axle being supported in said slots.

19. An apparatus for bending a glass sheet, comprising:
a) a bending chamber having an entrance and an exit;
b) conveyor rolls proximate the chamber entrance and exit for transporting the glass sheet to and from the bending chamber;
c) a first set of mini-rolls for supporting the glass sheet in the chamber;
d) a second set of mini-rolls arranged below said first set of mini-rolls for supporting the glass sheet in the chamber, said second set of mini-rolls constructed and arranged in longitudinal rows across the width of the chamber;
e) first means connected to said first set of mini-rolls for raising and lowering said first set of mini-rolls relative to said conveyor rolls;
f) second means connected to said second set of mini-rolls for raising and lowering each longitudinal row of mini-rolls to form a desired contour; and,
g) rotating means connected to said conveyor rolls and said mini-rolls.

20. The apparatus recited in claim 19, said chamber comprising a two-piece hearth having an upper portion and a lower portion, said upper portion constructed and arranged to be raised and lowered relative to said conveyor rolls.

21. The apparatus recited in claim 19, including a pre-heat oven for heating the glass sheet to a softened, bendable condition, and conveyor means for carrying the sheet from said oven to said chamber housing.

22. The apparatus recited in claim 19, said first set of mini-rolls comprising fused-silica mini-rolls.

23. The apparatus recited in claim 19, said second set of mini-rolls having a three-piece construction comprising:
a) a central hub having an annular outer surface, opposed side surfaces, and a central axis of rotation;

b) a collar fixed to each side surface of said central hub, said collars having an annular outer surface, inner and outer side surfaces, and a central axis of rotation, said collars comprising a material and shape which resists scratching glass.

24. The apparatus recited in claim 19, including an insulation layer arranged intermediate said first set of mini-rolls and said second set of mini-rolls, said insulation layer dividing said chamber into an upper and lower section.

25. The apparatus recited in claim 24, including heating means located in said upper and lower sections of said chamber, and cooling means located in said lower section.

26. The apparatus recited in claim 25, said cooling means comprising a plurality of transversely-extending, elongate, perforated air pipes connected to an air source.

27. The apparatus recited in claim 26, said insulation layer being mounted on top of said air pipes.

28. The apparatus recited in claim 27, including thermocouples located proximate said heating means, said cooling pipes, and said second set of mini-rolls.

29. The apparatus recited in claim 24, including means for controlling the temperature of the chamber in the upper section independent of the temperature in the lower section of the chamber.

30. The apparatus recited in claim 27, said insulation layer and air pipes constructed and arranged to be raised and lowered relative to said conveyor rolls.

31. A method of bending a glass sheet using a plurality of roller assemblies having a maximum operating temperature below the bending temperature of the glass sheet, comprising the steps of:

a) preheating the glass sheet at a temperature above the bending temperature of the glass sheet;

b) conveying the preheated glass sheet to a heated bending chamber having a plurality of roller assemblies arranged in longitudinal rows supporting the glass sheet;

c) controlling the temperature within the chamber proximate the roller assemblies below the maximum operating temperature of the roller assembly;

d) raising or lowering the rows of roller assemblies supporting the glass sheet to a desired contour; and, e) allowing the preheated glass sheet to bend to the desired contour of the roller assemblies.

* * * * *